(12) United States Patent
Ito

(10) Patent No.: US 11,838,458 B2
(45) Date of Patent: Dec. 5, 2023

(54) INFORMATION PROCESSING APPARATUS, METHOD OF CONTROLLING INFORMATION PROCESSING APPARATUS, AND STORAGE MEDIUM

(71) Applicant: CANON KABUSHIKI KAISHA, Tokyo (JP)

(72) Inventor: Yuki Ito, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/164,219

(22) Filed: Feb. 3, 2023

(65) Prior Publication Data

US 2023/0254420 A1     Aug. 10, 2023

(30) Foreign Application Priority Data

Feb. 9, 2022  (JP) ................................. 2022-018972

(51) Int. Cl.
*H04N 1/00* (2006.01)
*H04L 45/02* (2022.01)

(52) U.S. Cl.
CPC ......... *H04N 1/00244* (2013.01); *H04L 45/02* (2013.01); *H04N 2201/0039* (2013.01); *H04N 2201/0094* (2013.01)

(58) Field of Classification Search
CPC ..... H04N 1/00244; H04N 1/002; H04L 45/02
USPC ......................................................... 358/1.15
See application file for complete search history.

(56) References Cited

U.S. PATENT DOCUMENTS

2011/0235535 A1*  9/2011  Furukawa ............. G06F 1/3284
                                                                370/252
2018/0007421 A1*  1/2018  Yoo ....................... H04N 21/643

FOREIGN PATENT DOCUMENTS

JP          2012104869 A      5/2012

* cited by examiner

*Primary Examiner* — Darryl V Dottin
(74) *Attorney, Agent, or Firm* — ROSSI, KIMMS & McDOWELL LLP (57) ABSTRACT

An information processing apparatus connected to a network comprises detecting, as first processing, first change in a network environment based on configuration information of the network, acquiring packet information related to one or more packets among a plurality of packets transmitted and received in the network, and detecting, as second processing, second change in the network environment based on the packet information, wherein it is started to acquire the packet information if the first change in the network environment is detected by the first processing. The information processing apparatus can detect changes in the network environment with high accuracy without having to constantly acquire the packet information.

6 Claims, 9 Drawing Sheets

INFORMATION PROCESSING APPARATUS, METHOD OF CONTROLLING INFORMATION PROCESSING APPARATUS, AND STORAGE MEDIUM

BACKGROUND OF THE DISCLOSURE

Field of the Disclosure

The present disclosure relates to an information processing apparatus, a method of controlling the information processing apparatus, and a storage medium.

Description of the Related Art

As a security measure, various security-related functions of information devices must be properly configured. If information devices are fixed and used in a single environment, setting values tailored to the single environment can be applied at the time of shipment so that users can use the information devices with proper security measures without being aware of anything.

For example, in view of an environment in which multifunction devices are used, the multifunction devices are used not only in the office environment, but also used at home when working from home, or used in public spaces shared by an unspecified number of people. The environments in which the multifunction devices are used become more diverse. Because the proper security settings differ depending on the environments, it is necessary to make proper security settings for the environments. For example, the security settings should be changed if the environment changes. If an administrator of the information device has security expertise, the administrator is aware that the security settings need to be changed for each environment, and the administrator changes the security settings in accordance with the changes in the environment before using the multifunction devices.

A technique acquiring packets transmitted and received in a network to investigate a state of the network has been proposed. Japanese Patent Application Laid-Open No. 2012-104869 proposes a technique in which a capture start command is transmitted to a PC for acquiring packets so that a LAN switch sets a mirror port when a server detects an occurrence of an abnormality in the network, and a capture stop command is transmitted when a return of the abnormality is detected.

On the backdrop of the increasing number of personal information devices and the increasing number of people working at home, there are an increasing number of cases in which users without specialized security expertise manage information devices. In recent years, a possibility of attacks on information devices from attackers has increased because security measures taken by security administrators for personal information devices tend to be inadequate compared to those for information devices in corporate networks.

If the information devices change a connection from a network to another network having different properties, it is necessary to make security-related settings that suit the another network to which the information devices are connected. Users without security expertise may not recognize that they must change their security-related settings as the network environment changes. It is also hard for the users to identify and properly change security-related settings, even if the users recognize that the users must change their security-related settings. In this way, it is not easy for many users to recognize a change in a network to which the information devices are connected, and to change the security settings for the information devices in accordance with the change in the network.

SUMMARY OF THE DISCLOSURE

According to embodiments of the present disclosure, an information processing apparatus connected to a network comprises one or more memories and one or more processors that execute instructions to detect, as first processing, first change in a network environment based on configuration information of the network, acquire packet information related to one or more packets among a plurality of packets transmitted and received in the network, and detect, as second processing, second change in the network environment based on the packet information, wherein it is started to acquire the packet information for the second processing if the first change in the network environment is detected by the first processing.

Further features of the present disclosure will become apparent from the following description of exemplary embodiments with reference to the attached drawings.

DESCRIPTION OF THE EMBODIMENTS

Embodiments of the present disclosure are described below based on the drawings. In the present embodiment, a configuration in which an information processing apparatus as an edge device performs various determinations and operations to notify the cloud system of only a status will be described as an example. Each applicable solution has a different and proper control configuration, and it should be properly selected for each applicable solution whether the control is performed in the cloud system or in the edge device according to the balance of component cost and required response speed related to the computing resources of the edge device.

Figure 1:
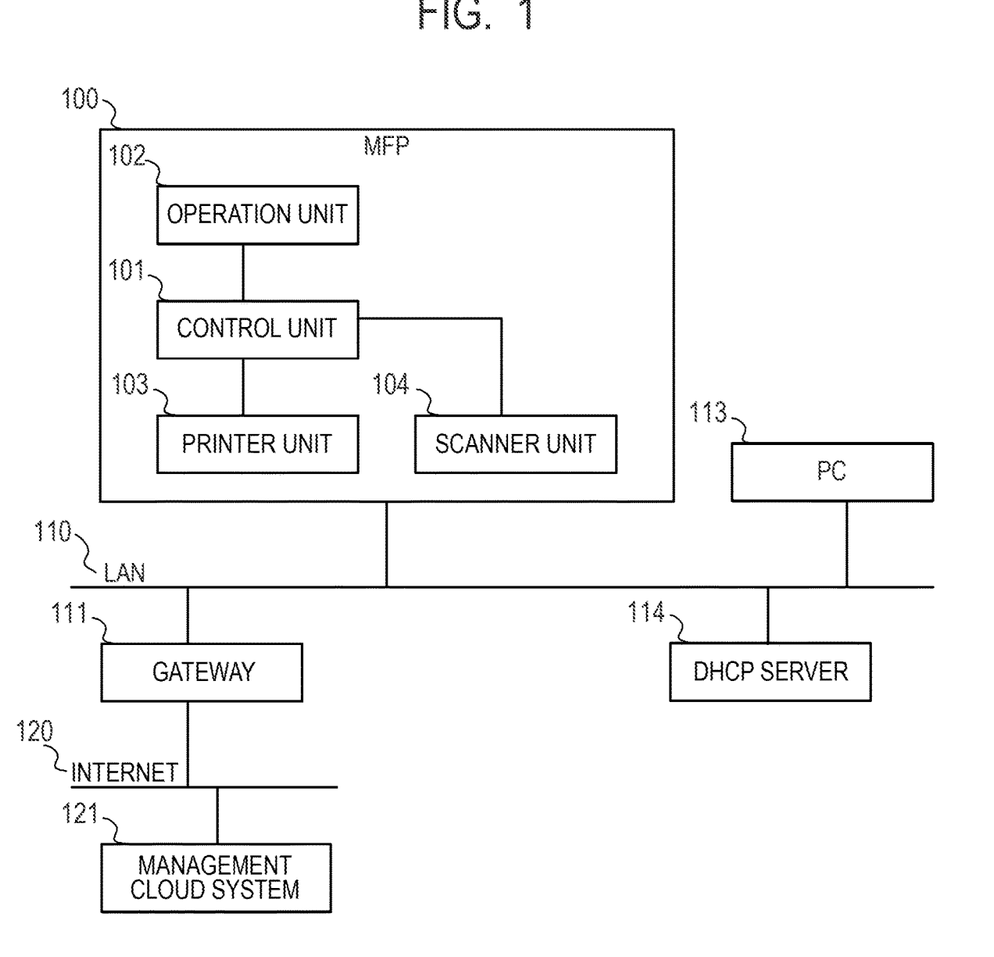
FIG. 1 illustrates connections between the MFP and the management cloud system.

FIG. 1 illustrates a diagram showing the connection configuration of an MFP (multi-function peripheral) 100, a gateway 111, a management cloud system 121, a PC 113, and a DHCP (dynamic host configuration protocol) server 114 for the present embodiment. The MFP 100 and the management cloud system 121 are connected via a LAN (local area network) 110, the gateway 111, and an internet 120. The MFP 100 is connected to the PC 113 and the DHCP server 114 via the LAN 110.

The MFP 100 has an operation unit 102 performing input/output processing for a user, a printer unit 103 printing electronic data to a paper medium, and a scanner unit 104 scanning the paper medium and converting scanned images into electronic data. The operation unit 102, the printer unit 103, and the scanner unit 104 are connected to a control unit 101 to realize the function as a multi-function peripheral according to the control of the control unit 101. The MFP 100 may be an example of an information processing apparatus.

The gateway 111 is a network router that relays communications from the MFP 100 to and from the internet 120. The PC 113 is a personal computer. The DHCP server 114 is a server that assigns setting information related to network connections such as an IP (Internet Protocol) address to each device connected to the LAN 110. The management cloud system 121 remotely monitors a status of the MFP 100.

Figure 2:
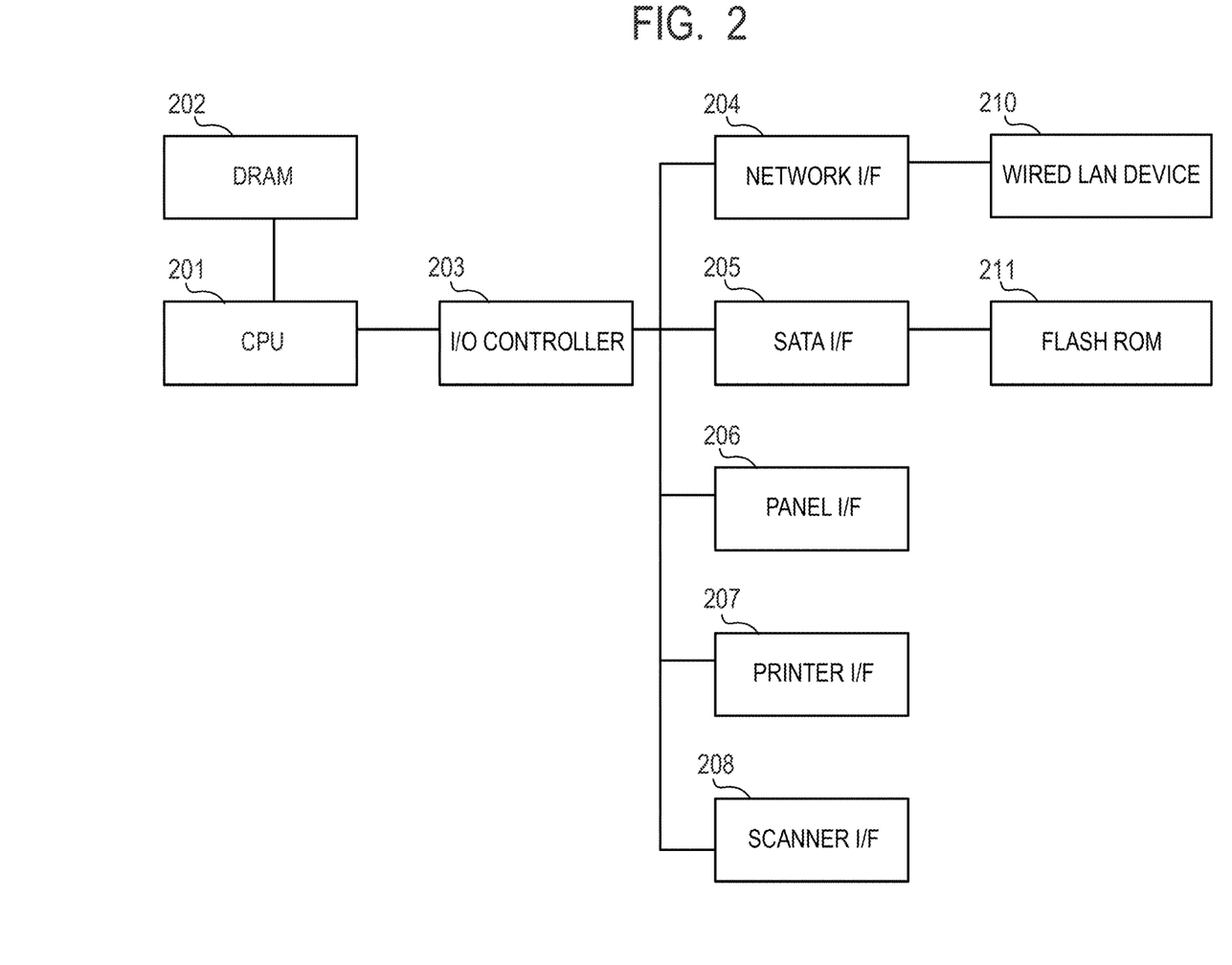
FIG. 2 illustrates an example of the configuration of the control unit of the MFP.

FIG. 2 illustrates a block diagram showing an example configuration of the control unit 101 of the MFP 100. A CPU (Central Processing Unit) 201 performs main arithmetic processing in the control unit 101. The CPU 201 is connected to a DRAM (Dynamic Random Access Memory) 202 via a bus. The DRAM 202 is used by the CPU 201 as program data representing operation instructions in the process of operation by the CPU 201 and as a working memory for arranging data to be processed. The CPU 201 is connected to an I/O controller 203 via the bus. The I/O controller 203 performs input and output to and from various devices according to instructions from the CPU 201.

A SATA (Serial Advanced Technology Attachment) I/F 205 is connected to the I/O controller 203. A Flash ROM (Read Only Memory) 211 is connected to the SATA I/F 205. The CPU 201 uses the flash ROM 211 to store programs and document files for implementing the functions of the MFP 100. A network I/F 204 is connected to the I/O controller 203. A wired LAN device 210 is connected to the network I/F 204. The CPU 201 controls the wired LAN device 210 via the network I/F 204 to realize communications over the LAN 110.

A panel I/F 206 is connected to the I/O controller 203. The CPU 201 realizes input/output from the user to the operation unit 102 via the panel I/F 206. A printer I/F 207 is connected to the I/O controller 203. The CPU 201 realizes the printing processing of paper media using the printer unit 103 via the printer I/F 207. A scanner I/F 208 is connected to the I/O controller 203. The CPU 201 realizes the scanning processing of the paper documents using the scanner unit 104 via the scanner I/F 208.

For example, when a copy function is performed, the CPU 201 reads out program data from the flash ROM 211 into the DRAM 202 via the SATA I/F 205. According to the program read into DRAM 202, the CPU 201 detects a copy instruction from the user to the operation unit 102 via the panel I/F 206. If the CPU 201 detects the copy instruction, the CPU 201 receives a document from the scanner unit 104 as image data via the scanner I/F 208 and stores the image data in the DRAM 202. The CPU 201 performs color conversion processing suitable for output on the image data stored in the DRAM 202. The CPU 201 transfers the image data stored in the DRAM 202 to the printer unit 103 via the printer I/F 207 and performs the printing processing to the paper medium.

Figure 3:
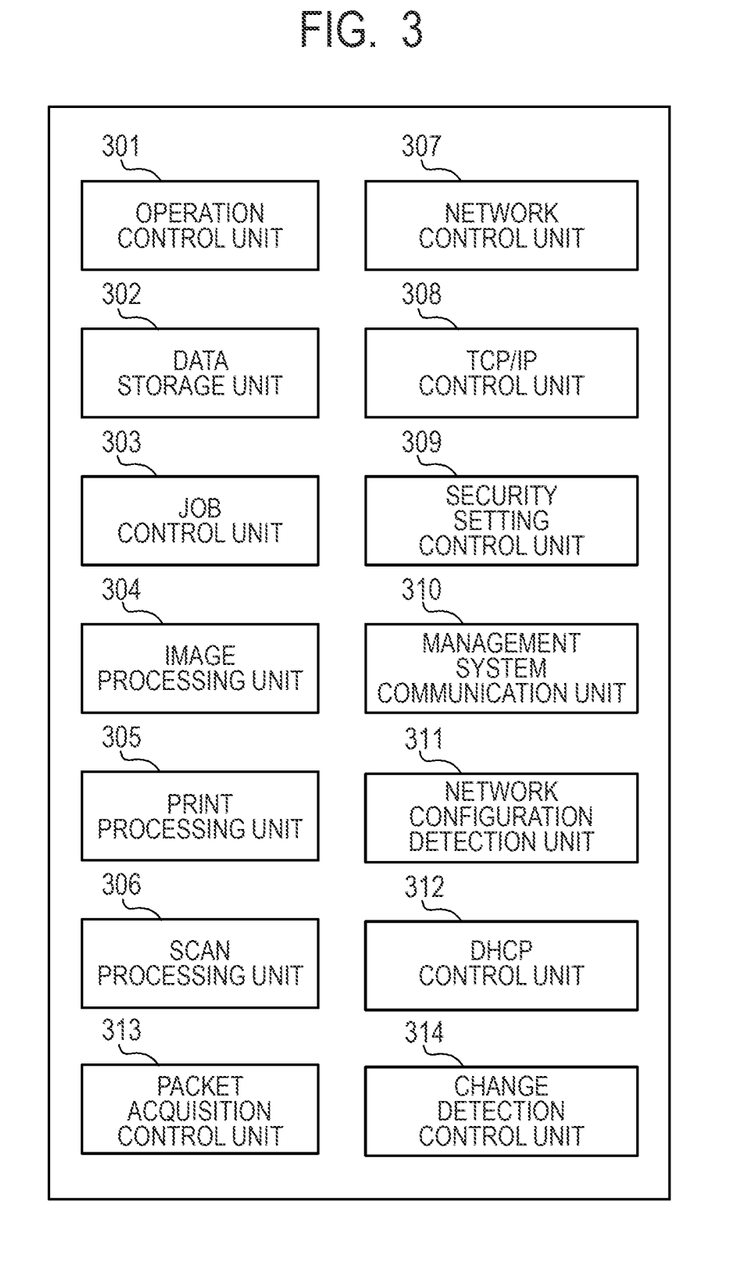
FIG. 3 illustrates an example of the functional configuration of the control unit of the MFP.

FIG. 3 illustrates a block diagram showing an example of a functional configuration realized by software executed in the control unit 101 of the MFP 100. All software executed in the control unit 101 is executed after the CPU 201 reads the program stored in the flash ROM 211 into the DRAM 202.

An operation control unit 301 displays a screen image for the user on the operation unit 102, detects the user operation, and executes the processing associated with screen components such as buttons displayed on the screen. A data storage unit 302 writes and reads data to and from the flash ROM 211 upon request from another control unit. For example, if the user wants to change some device settings, the operation control unit 301 detects the contents entered by the user in the operation unit 102, and the data storage unit 302 stores the changed device settings as setting values in the flash ROM 211 upon request from the operation control unit 301.

A job control unit 303 controls job execution according to instructions from other control units. An image processing unit 304 processes the image data into another data in a format suitable for each application according to instructions from the job control unit 303. A print processing unit 305 prints the image on the paper medium via the printer I/F 207 according to the instruction from the job control unit 303. A scan processing unit 306 scans original documents via the scanner I/F 208 according to the instruction from the job control unit 303.

A network control unit 307 performs network settings such as an IP address for a TCP/IP control unit 308 at the time of starting up the system or detecting a change in settings according to the setting values stored in the data storage unit 302. The TCP/IP control unit 308 performs transmission/reception processing of network packets via the network I/F 204 according to the instruction from other control units.

A security setting control unit 309 controls the security setting of the MFP 100. The security setting control unit 309 manages the relationship between a network environment such as an in-house LAN, home, or a public space and security-related setting items corresponding to the network environment, and can collectively set the corresponding security-related settings if the user specifies the network environment. The security setting control unit 309 uses the data storage unit 302 to refer to and change the setting values.

A management system communication unit 310 uses the network control unit 307 to transfer information between the management cloud system 121 and the MFP 100. For example, the management system communication unit 310 notifies the management cloud system 121 of a change in the settings stored in the data storage unit 302, so that the management cloud system 121 can identify what setting the MFP 100 is operating with. When instructions to change settings are given in the management cloud system 121, the management system communication unit 310 receives a notification and performs processing to reflect the setting values in the data storage unit 302. In this way, by synchronizing the information of the MFP 100 in both directions, the information of the MFP 100 can be confirmed and changed in real time by the management cloud system 121. The management system communication unit 310 also performs information transmission processing to the management cloud system 121 for the network configuration information stored in the data storage unit 302 by a network configuration detection unit 311.

The network configuration detection unit 311 collects network configuration information related to the configuration of the presently connected network and stores network configuration information related to the configuration of the previously connected network. The network configuration detection unit 311 also performs processing to detect a change in the network environment to which the MFP 100 is connected, based on the acquired network configuration information. The network configuration detection unit 311 may be an example of the first detection means. The collection of network configuration information by the network configuration detection unit 311 is performed, for example, at the time when the network control unit 307 starts network communications based on the information stored in the data storage unit 302. The network configuration information includes information from other information processing apparatuses connected to the same network. The network configuration information includes, for example, a MAC (Media Access Control) address that physically identifies a default gateway apparatus connected to the network. In the present embodiment, the default gateway apparatus may be the gateway 111. Further, for example, the network configuration information includes the MAC address of the DHCP server assigning an IP address, the IP address, and the network address of the DHCP server assigned by itself. In the present embodiment, the network configuration information can be acquired from the DHCP server 114. Furthermore, for example, the network configuration information includes the RA (Router Advertisement) information of the connecting IPv6 router. In the present embodiment, the IPv6 router may be the gateway 111. The network configuration detection unit 311 collects the network configuration information by using the network control unit 307 to perform communications according to the corresponding protocol. When the collection of network configuration information is completed, the network configuration detection unit 311 stores the network configuration information in the data storage unit 302 as the network configuration information acquired at the present time. The network configuration information acquired at the previous time is also stored in the data storage unit 302. When the network configuration information acquired at the present time is stored in the data storage unit 302, the storage area can be optimized by deleting the network configuration information acquired at the time before the previous time if it has been stored in the data storage unit 302.

A DHCP control unit 312 communicates with the DHCP server 114 in accordance with the DHCP to determine the IP address, network address, and subnet mask of the MFP 100. The DHCP control unit 312 stores the determined IP address, the network address, and the subnet mask in the data storage unit 302. When the determined IP address, the network address, and the subnet mask are stored in the data storage unit 302, the network control unit 307 performs network communications using the setting. The DHCP control unit 312 starts processing at the timing of network initialization such as the timing of the device being started, but also at the timing based on the lease time of the IP address assigned by the DHCP server 114. Even when information such as an IP address is updated at a timing based on the lease time, the DHCP control unit 312 stores the information in the data storage unit 302, and the network control unit 307 performs network communications using the setting.

A packet acquisition control unit 313 analyzes and acquires, from among the packets transmitted and received in a connected network, packet information related to the packets necessary for estimating the changes in the network environment and the network environment after such changes. Starting and stopping the acquisition of packet information in the packet acquisition control unit 313 are controlled by a change detection control unit 314. The packet acquisition control unit 313 detects a change in the network environment to which the MFP 100 is connected, based on the acquired packet information. Furthermore, the packet acquisition control unit 313 estimates the network environment (the environment of the MFP 100) to which the MFP 100 is connected based on the acquired packet information. In the present embodiment, the packet acquisition control unit 313 may be the second detection means. The packet acquisition control unit 313 may acquire the packet information in a network such as a wired LAN, a wireless LAN, or both a wired LAN and a wireless LAN. The packet corresponding to the packet information acquired by the packet acquisition control unit 313 may be broadcast, multicast only, or unicast. The accuracy of change detection and environment estimation for the network environment increase with a length of the packet acquisition period. However, the proper packet acquisition period depends on the environment to which the MFP 100 is connected since the time of high load on the CPU and other resources increases with the length of the packet acquisition period. In an environment with a high packet flow rate, sufficient accuracy can be achieved even if the packet acquisition period is short, but in an environment with a low packet flow rate, sufficient accuracy cannot be achieved unless the packet acquisition period is long. If the acquisition period is set short, it is possible to detect changes and estimate the environment even in 60 seconds, for example. When the packet information collection is completed, the packet acquisition control unit 313 stores the packet information in the data storage unit 302 as the packet information acquired at the present time. The packet information acquired at the previous time is also stored in the data storage unit 302. When the packet information acquired at the present time is stored in the data storage unit 302, the storage area can be optimized by deleting the packet information acquired at the time before the previous time if it has been stored in the data storage unit 302.

The change detection control unit 314 performs control related to processing for detecting a change in the network environment to which the MFP 100 is connected. For example, when a change in the network environment is detected by the network configuration detection unit 311, the change detection control unit 314 controls the packet acquisition control unit 313 to start acquiring packet information based on the setting value set by the operation control unit 301. Note that if the change detection control unit 314 is set to detect a change without acquiring packets, detection of a change in the network environment is determined only based on the change in the network configuration information.

Figure 4:
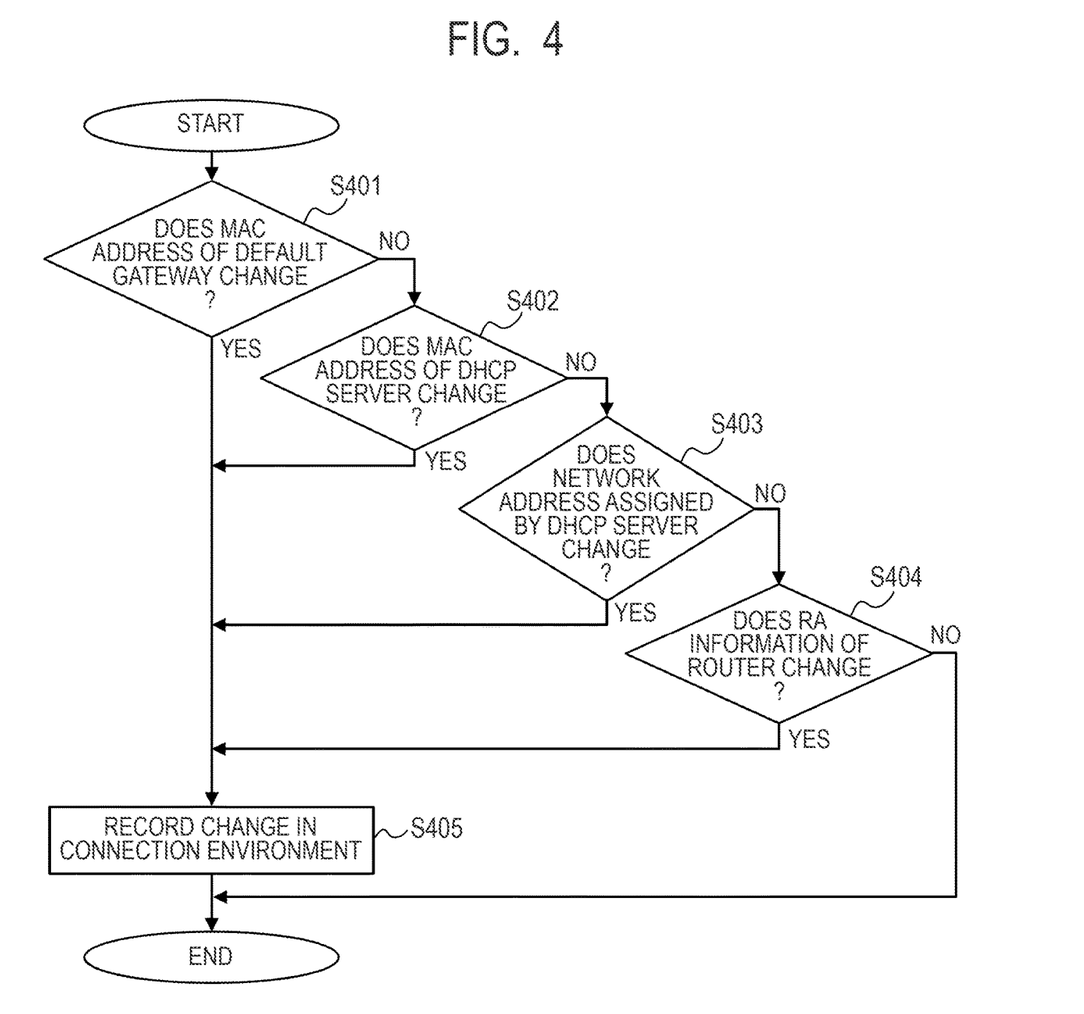
FIG. 4 illustrates a flowchart showing the change detection processing based on network configuration information.

With reference to FIG. 4, the process for detecting a change in the connected network environment by the MFP 100 based on the network configuration information will be described. FIG. 4 illustrates a flowchart showing the change detection processing based on the network configuration information. The processing of the flowchart in FIG. 4 is performed by the network configuration detection unit 311 of the MFP 100, and is realized by executing a program after the CPU 201 reads out the program stored in the flash ROM 211 into the DRAM 202. The processing of the flowchart in FIG. 4 is executed at the time when the network control unit 307 of the MFP 100 starts network communications.

In step S401, the MFP 100 determines whether or not there is a change in the MAC address of the default gateway. The MFP 100 compares the MAC address information of the default gateway included in the present network configuration information and the previously acquired network configuration information stored in the data storage unit 302 to determine whether or not there is a change in the MAC address. If the present MAC address information does not match the previously acquired MAC address information and it is determined that the MAC address of the default gateway has changed (YES in step S401), the process proceeds to step S405. If the present MAC address information matches the previously acquired MAC address information and it is determined that the MAC address of the default gateway has not changed (NO in step S401), the process proceeds to step S402.

In step S402, the MFP 100 determines whether or not there is a change in the MAC address of the DHCP server. The MFP 100 compares the MAC address information of the DHCP server included in the present network configuration information and the previously acquired network configuration information stored in the data storage unit 302 to determine whether or not there is a change in the MAC address. If the present MAC address information does not match the previously acquired MAC address information and it is determined that the MAC address of the DHCP server has changed (YES in step S402), the process proceeds to step S405. If the present MAC address information matches the previously acquired MAC address information and it is determined that the MAC address of the DHCP server has not changed (NO in step S402), the process proceeds to step S403.

In step S403, the MFP 100 determines whether or not there is a change in the network address allocated by the DHCP server. The MFP 100 compares the network address information included in the present network configuration information and the previously acquired network configuration information stored in the data storage unit 302 to determine whether or not there is a change in the network address. If the present network address information does not match the previously acquired network address information and it is determined that the network address has changed (YES in step S403), the process proceeds to step S405. If the present network address information matches the previously acquired network address information and it is determined that the network address has not changed (NO in step S403), the process proceeds to step S404.

In step S404, the MFP 100 determines whether or not there is a change in the RA information of the IPv6 router. The MFP 100 compares the RA information of the router included in the present network configuration information and the previously acquired network configuration information stored in the data storage unit 302 to determine whether or not there is a change in the RA information. If the present RA information does not match the previously acquired RA information and it is determined that the RA information of the router has changed (YES in step S404), the process proceeds to step S405. If the present RA information matches the previously acquired RA information and it is determined that the RA information of the router has not changed (NO in step S404), the processing of the flowchart in FIG. 4 is terminated.

In step S405, the MFP 100 stores in the data storage unit 302 information indicating that there is a change in the connection environment due to the network configuration information. In this way, by executing the processing of the flowchart in FIG. 4, the MFP 100 can generate a detection result as to whether or not the network environment has changed based on the network configuration information.

Figure 5:
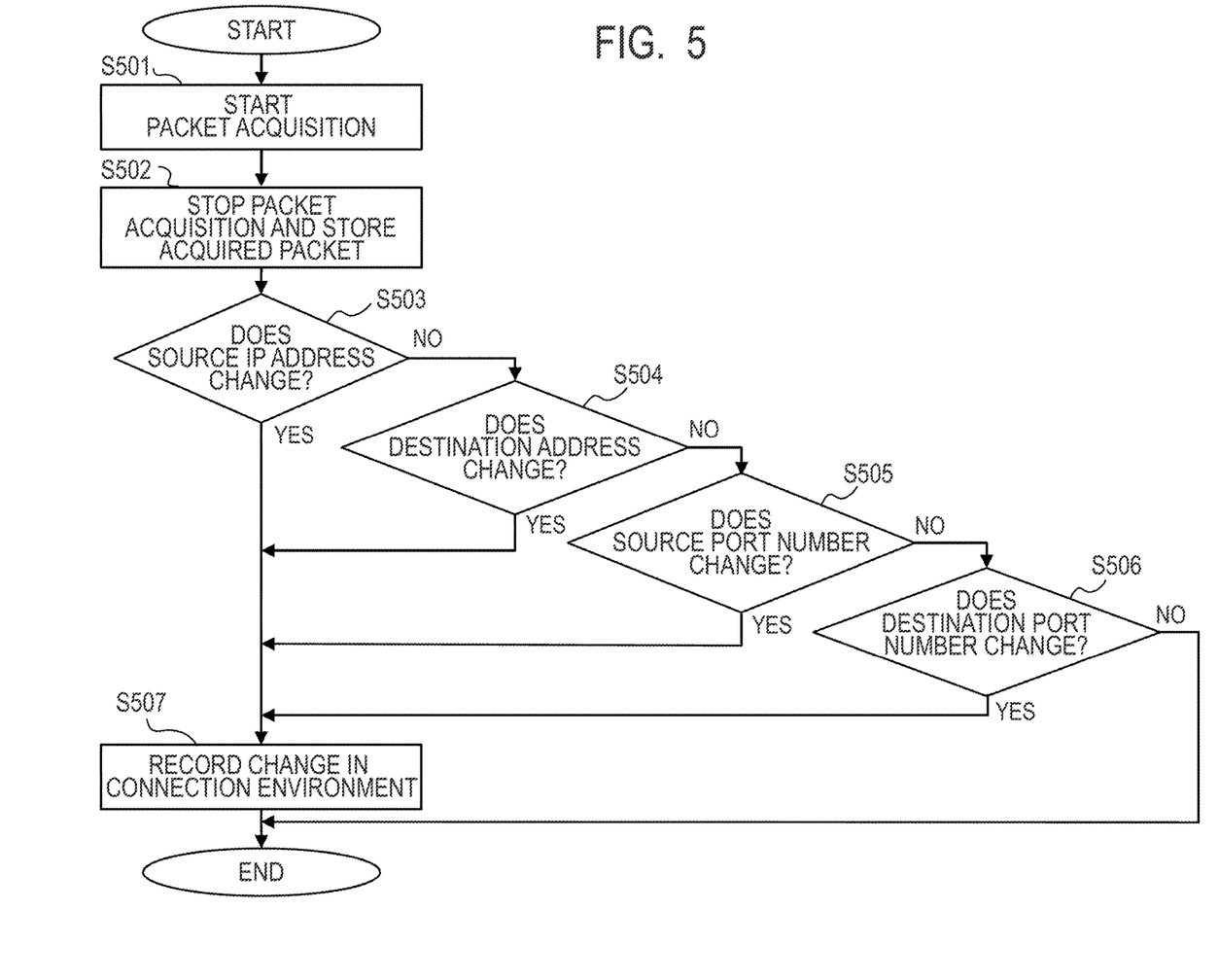
FIG. 5 illustrates a flowchart showing the change detection processing based on packet information.

With reference to FIG. 5, the process for acquiring packet information and detecting a change in the connected network environment by the MFP 100 based on the acquired packet information will be described. FIG. 5 illustrates a flowchart showing the change detection processing based on packet information. The processing of the flowchart in FIG. 5 is performed by the packet acquisition control unit 313 of the MFP 100 and is realized by executing a program after the CPU 201 reads out the program stored in the flash ROM 211 into the DRAM 202. The processing of the flowchart in FIG. 5 is performed when the packet acquisition control unit 313 of the MFP 100 is instructed to acquire packets by the change detection control unit 314.

In step S501, the MFP 100 starts acquiring packets flowing via the connected network. After the lapse of the time set in a packet acquisition period 620 in the packet acquisition setting screen shown in FIG. 6, which will be described later, in step S502, the MFP 100 stops acquiring packets and stores the acquired packets. In this way, the MFP 100 acquires packets that are transmitted and received in the network during a predetermined period.

In steps S503 to S507, the MFP 100 compares the packet information acquired at the previous time with the packet information acquired at the present time. In step S503, the MFP 100 determines whether or not the source IP address communicating the most times among the source IP addresses included in the acquired packet information is changed. The MFP 100 compares the source IP address communicating the most time in the previously acquired packet information with the most source IP address communicating the most time in the presently acquired packet information to determine whether or not there is a change. If it is determined that there is a change in the source IP address (YES in step S503), the process proceeds to step S507. If it is determined that there is no change (NO in step S503), the process proceeds to step S504.

In step S504, the MFP 100 determines whether or not the destination IP address communicating the most time among the destination IP addresses included in the acquired packet information is changed. The MFP 100 compares the destination IP addresses communicating the most time in the previously acquired packet information with the destination IP addresses communicating the most time in the presently acquired packet information to determine whether or not there is a change. If it is determined that there is a change in the destination IP address (YES in step S504), the process proceeds to step S507. If it is determined that there is no change (NO in step S504), the process proceeds to step S505.

In step S505, the MFP 100 determines whether or not the source port number communicating the most time among the source port numbers included in the acquired packet information is changed. The MFP 100 compares the source port number communicating the most time in the previously acquired packet information with the source port number communicating the most time in the presently acquired packet information to determine whether or not there is a change. If it is determined that there is a change in the source port number (YES in step S505), the process proceeds to step S507. If it is determined that there is no change (NO in step S505), the process proceeds to step S506.

In step S506, the MFP 100 determines whether or not the destination port number communicating the most time among the destination port numbers included in the acquired packet information is changed. The MFP 100 compares the destination port number communicating the most time in the previously acquired packet information with the destination port number communicating the most time in the presently acquired packet information to determine whether or not there is a change. If it is determined that there is a change in the destination port number (YES in step S506), the process proceeds to step S507. If it is determined that there is no change (NO in step S506), the process of the flowchart in FIG. 5 is terminated.

In step S507, the MFP 100 stores in the data storage unit 302 information indicating that there is a change in the connection environment due to the packet information. In this way, by executing the processing of the flowchart in FIG. 5, the MFP 100 acquires the packet information and, based on the acquired packet information, can generate a detection result as to whether or not the network environment has changed. The embodiment is not limited to the comparison between the previously acquired packet information and the presently acquired packet information described above. Any information included in the packet information may be used. Further, machine learning may also be used to determine if certain information in packets is changed.

Figure 6:
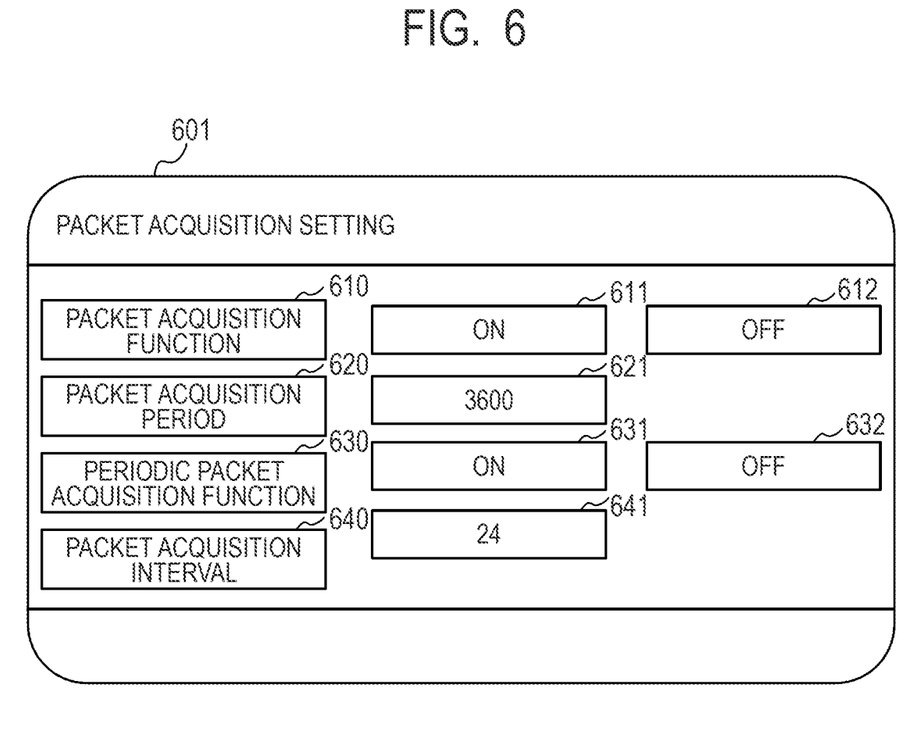
FIG. 6 illustrates a diagram showing a screen configuration for packet acquisition settings.

FIG. 6 illustrates a packet acquisition setting screen 601 displayed in the operation unit 102. In FIG. 6, a setting item for a packet acquisition function 610 indicates whether or not to execute a function of the packet acquisition (acquiring of packet information) and can be set by pressing an ON button 611 or an OFF button 612. If the ON button 611 of the packet acquisition function 610 is pressed, the packet acquisition function is set (ON). If the OFF button 612 of the packet acquisition function 610 is pressed, the packet acquisition function is not set (OFF).

A setting item for the packet acquisition period 620 sets the time from the start of acquiring the packets (acquisition of packet information) to the stop of acquiring the packets (acquisition of packet information), and the unit may be the second for example. The setting of the packet acquisition period 620 is effective only if the packet acquisition function 610 is set to "ON". In the example shown in FIG. 6, a packet acquisition period display unit 621 displays "3600". If the packet acquisition function 610 is set to "ON", the packets are acquired within 3600 seconds from the start of acquiring the packets, and packet acquisition is stopped after 3600 seconds.

A setting item for an periodic packet acquisition function 630 sets whether or not to periodically acquire packets (packet information) and can be set by pressing an ON button 631 or an OFF button 632. The periodic packet acquisition function 630 is effective only if the packet acquisition function 610 is set to "ON". If the ON button 631 of the periodic packet acquisition function 630 is pressed, the packets are periodically acquired (ON). If the OFF button 632 of the periodic packet acquisition function 630 is pressed, the packets are not periodically acquired (OFF).

A setting item for a packet acquisition interval 640 sets the time from the time of stopping packet acquisition to the time of starting packet acquisition again, and the unit may be the hour for example. The packet acquisition interval 640 is effective only if both the packet acquisition function 610 and the periodic packet acquisition function 630 are set to "ON". In the example shown in FIG. 6, an acquisition interval display unit 641 displays "24". If the packet acquisition is set to be periodically performed, the packet acquisition is started again 24 hours after the packet acquisition is stopped.

If each setting item shown in FIG. 6 is not valid, each setting item may be configured to be unselectable by graying out or hiding the items or buttons. Moreover, it may be possible to set a time to start the packet acquisition to start the packet acquisition at a set time every day.

Figure 7:
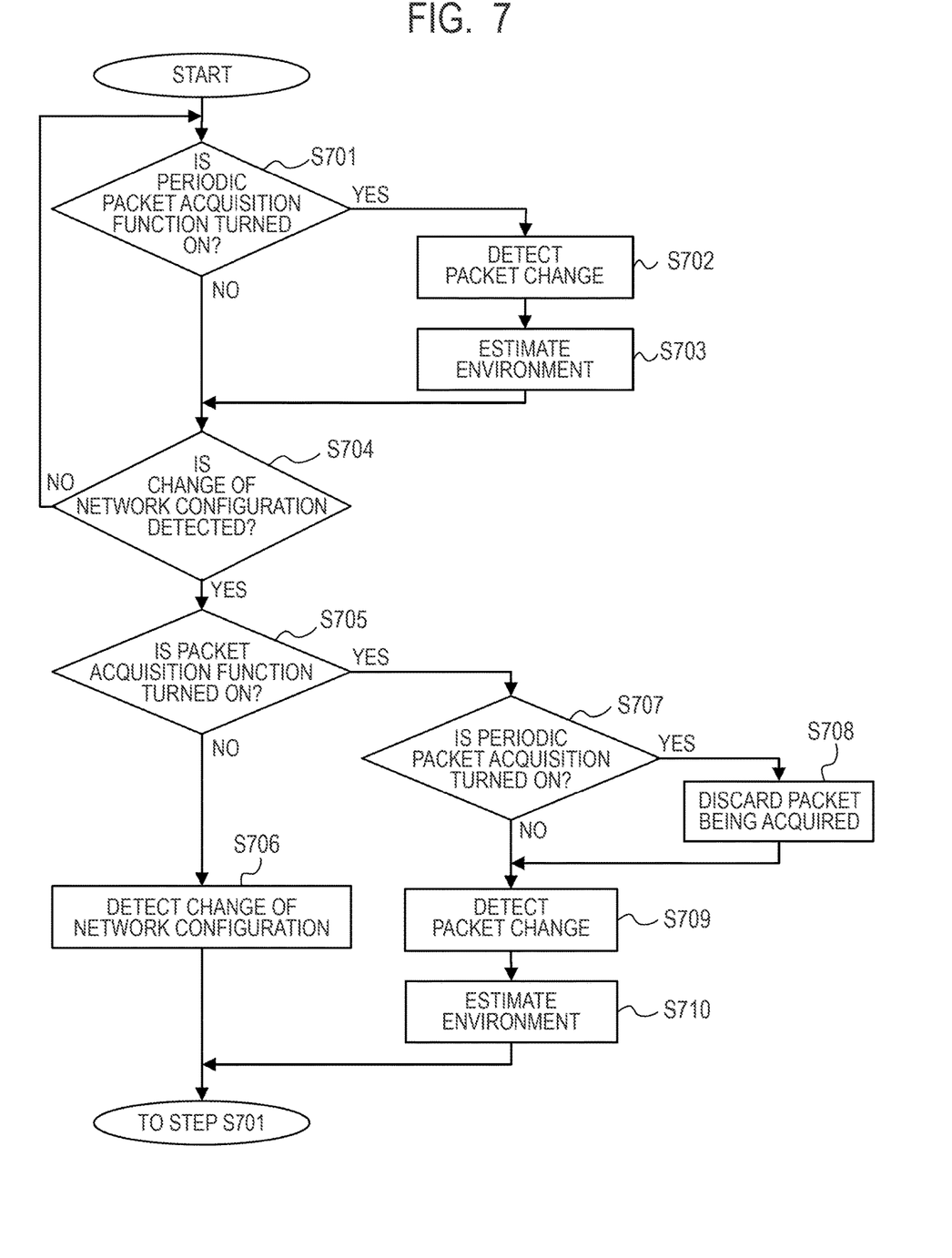
FIG. 7 illustrates a flowchart showing an environment detection processing of the MFP.

The processing for detecting changes in the network environment and estimating the network environment by the MFP 100 will be described with reference to FIG. 7. FIG. 7 illustrates a flow chart showing the environment detection processing performed by the MFP 100. In the present embodiment, an example that the MFP 100 starts acquiring packets (acquisition of packet information) if the change is detected by change detection processing based on the network configuration information is described. The processing of the flowchart in FIG. 7 is realized by the CPU 201 reads out a program stored in the flash ROM 211 into the DRAM 202 and then executes the program. The processing of the flowchart in FIG. 7 is started when the MFP 100 is started.

In step S701, the MFP 100 determines whether or not the periodic packet acquisition function 630 of FIG. 6 is set to "ON". If it is determined that the periodic packet acquisition function 630 is set to "ON" (YES in step S701), the process proceeds to step S702. If it is determined that the periodic packet acquisition function 630 is set to "OFF" (NO in step S701), the process proceeds to step S704.

In step S702, the MFP 100 determines a detection regarding a change in the network environment by detecting a change based on the packet information as shown in FIG. 5. If it is determined that a change is detected, the MFP 100 stores in the data storage unit 302 information indicating that the network environment is changed. The time from the start to the stop of the packet acquisition (packet information acquisition) follows the set value of the packet acquisition period 620 shown in FIG. 6.

Figure 8:
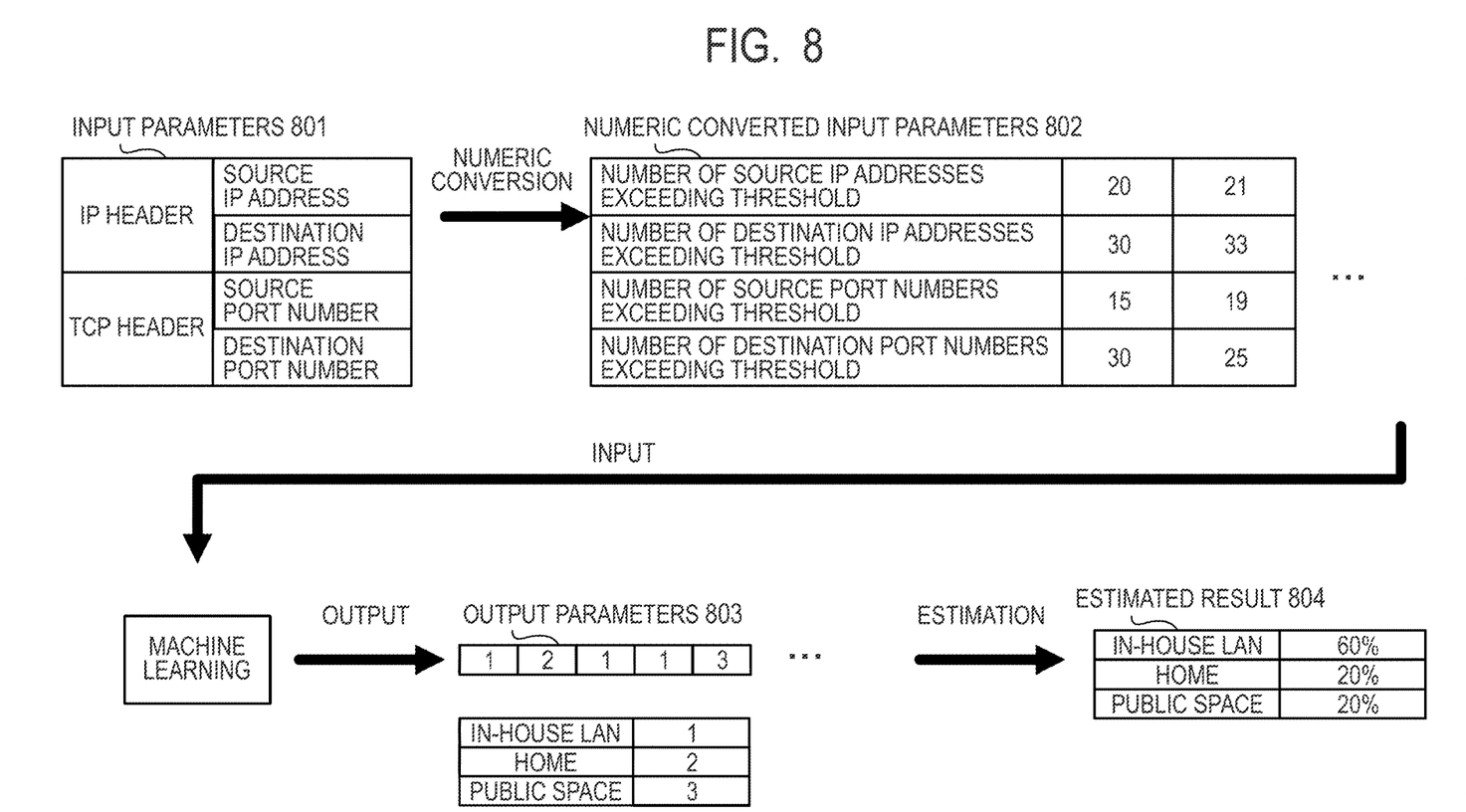
FIG. 8 illustrates a diagram showing an environment estimation processing.

In step S703, the MFP 100 performs environment estimation processing to estimate the network environment by machine learning as shown in FIG. 8. FIG. 8 illustrates a diagram showing the environment estimation processing. The environment estimation is performed with pre-trained model obtained by machine learning. It is assumed that supervised learning is used for the machine learning, the machine learning is performed using the packet information acquired in a specific network environment as input for supervised learning. Here, as shown in FIG. 8, numbers corresponding to each type of network environment are assigned, such as "1" for in-house LAN, "2" for home, "3" for public space, and so on. For example, the source IP address of the IP header and the destination IP address of the IP header in the acquired packet, and the source port number of the TCP header and the destination port number of the TCP header may be used as input parameters. The input parameters included in the packet, such as TTL (Time to Live), a window size, or a flag, may be used as input parameters. Numeric converted input parameters 802 are parameters in which input parameters 801 are converted into numerical values. The converted input parameters are the respective time series data of the number of source IP addresses exceeding a threshold, the number of destination IP addresses exceeding a threshold, the number of source port numbers exceeding a threshold, and the number of destination port numbers exceeding a threshold. It should be noted that any converting means may be used. A result of the machine learning is the pre-trained model. Then, for the pre-trained model, the data included in the actual packet information is used as the input parameter 801, and the input parameter 801 is numerically converted and used as the input parameter 802 to perform the environment estimation processing. In FIG. 8, output parameters 803 are output from the pre-trained model. The output parameters 803 indicate the network environment (the environment), and are output as a sequence of numerical values if, for example, the in-house LAN is set to "1", the home is set to "2", and the public space is set to "3". The type of network environment may be any number of types, including direct connection to the internet and prohibition of the internet. An estimated result 804 is estimated based on the statistics of the type of network environment in the output parameters 803, and in the example shown in FIG. 8, the probability that the network environment is the in-house LAN is 60%, the probability that the network environment is the home is 20%, and the probability that the network environment is the public space is 20%. In this case, the in-house LAN with the highest probability among the estimated network environments is assumed to be the estimated result of the network environment in the environment estimation processing.

In step S704, the MFP 100 determines whether or not a change is detected by change detection processing based on the network configuration information as shown in FIG. 4. If it is determined that a change is detected (YES in step S704), the processing proceeds to step S705. If it is determined that no change is detected (NO in step S704), the processing returns to step S701.

In step S705, the MFP 100 determines whether or not the packet acquisition function 610 shown in FIG. 6 is set to "ON". If it is determined that the packet acquisition function 610 is not set to "ON", that is, set to "OFF" (NO in step S705), the process proceeds to step S706. If it is determined that the packet acquisition function 610 is set to "ON" (YES in step S705), the process proceeds to step S707.

In step S706, the MFP 100 performs detection determination by detecting a change based on the network configuration information. If it is determined that a change is detected, the MFP 100 stores in the data storage unit 302 information indicating that there is a change in the network environment, and the process returns to step S701. The change detection based on the network configuration information is completed in the process of step S704.

In step S707, the MFP 100 determines whether or not the periodic packet acquisition function 630 shown in FIG. 6 is set to "ON". If it is determined that the periodic packet acquisition function 630 is set to "ON" (YES in step S707), the process proceeds to step S708. If it is determined that the periodic packet acquisition function 630 is not set to "ON", that is, set to "OFF" (NO in step S707), the process proceeds to step S709.

In step S708, the MFP discards the packets being acquired and proceeds to step S709 because the MFP 100 may have started acquiring the packets even before the change is detected by the change detection processing based on the network configuration information.

In step S709, the MFP 100 determines whether to detect a change in the network environment by detecting a change based on the packet information as shown in FIG. 5. If it is determined that there is a change, the MFP 100 stores information indicating that there is a change in the network environment in the data storage unit 302 and the process returns to step S701. The time from the start to the stop of acquiring packets (acquisition of packet information) follows the set value of the packet acquisition period 620 shown in FIG. 6. The time from the stop of acquiring the packets (acquisition of packet information) to the restart of acquiring the packets follows the set value of the packet acquisition interval 640 shown in FIG. 6.

In step S710, the MFP 100 performs environment estimation processing to estimate the network environment by the machine learning as shown in FIG. 8. After the environment estimation processing is finished and the estimation result of the network environment is obtained, the process returns to step S701.

The information indicating that there is a change in the network environment stored in the data storage unit 302 is retained in a case of detecting that there is a change in the network environment or until the stored information is changed to information indicating that there is no change in the network environment when a detection release button 1005 in FIG. 10, which will be described later, is pressed.

As described above, by executing the processing of the flowchart shown in FIG. 7, the packet acquisition can be started at a proper timing without always acquiring packets (packet information), and a detection result can be generated as to whether or not the network environment is changed. Based on the acquired packets (packet information), it is also possible to estimate the network environment of the MFP 100.

Note that the packet acquisition (acquisition of packet information) is started if a change is detected by the change detection processing based on the network configuration information, but the packet acquisition may be started when the MFP 100 is started or when the network changes from a disconnected state to a connected state. The embodiment of the environment estimation processing after change detection in the network environment is shown above, but the environment estimation processing may not be performed and only the change detection processing in the network environment may be used.

Figure 9:
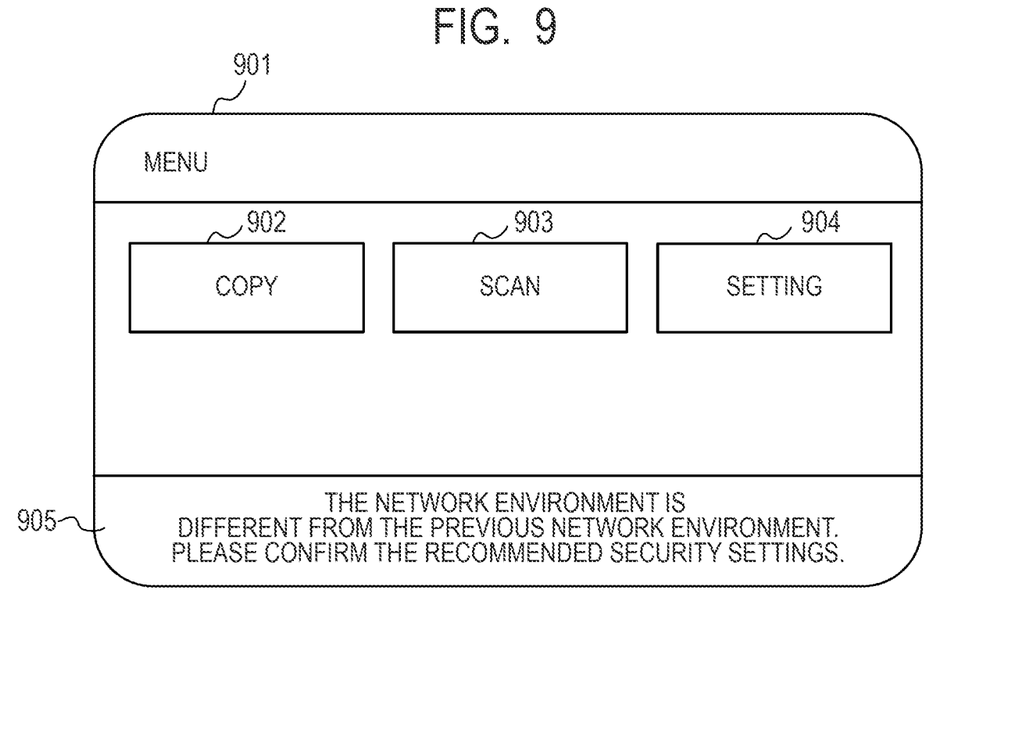
FIG. 9 illustrates a diagram showing a screen configuration of the menu screen.

FIG. 9 illustrates a menu screen 901 displayed on the operation unit 102. In FIG. 9, a copy button 902, a scan button 903, and a setting button 904 are used to execute the corresponding functions of the MFP 100, respectively. An information notification unit 905 is used to notify the user of information. For example, if it is detected that the network environment is changed, the information notification unit 905 can notify the user of a result of the detection by displaying that the network environment is changed, and the user can be prompted to change the security setting, and the like. In order to support the user's operation after the notification, the screen may be switched to the screen of the operation in response to touching the information notification unit 905 by the user. For example, if the user taps the screen at the time of displaying a notification that the network environment is changed, a recommended security setting screen 1001 as shown in FIG. 10 can be displayed so that the user does not get lost in the operation procedure.

Figure 10:
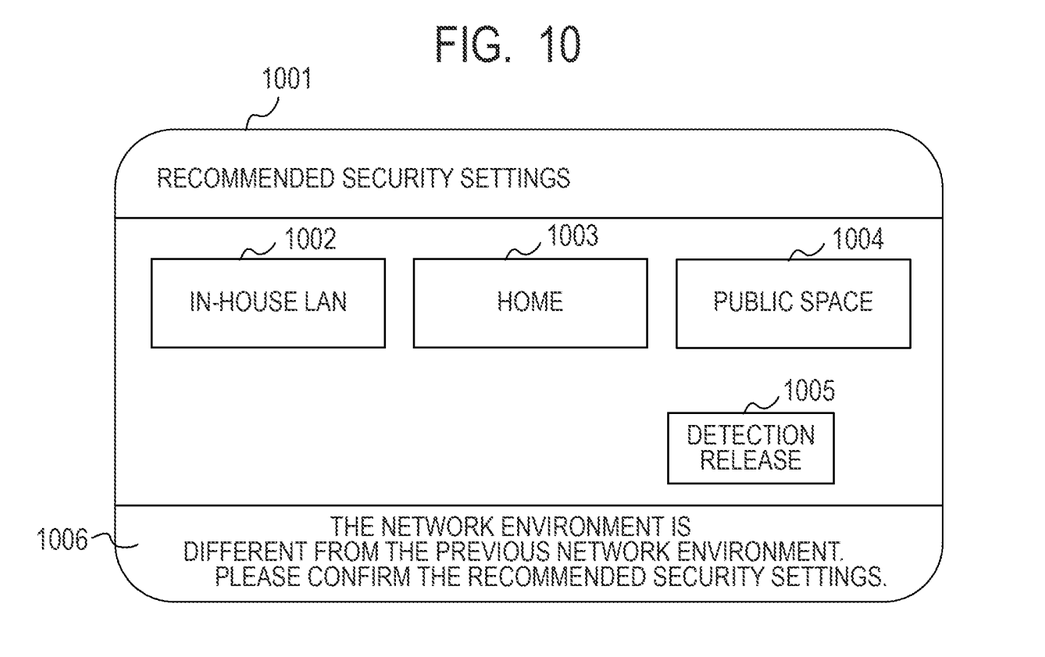
FIG. 10 illustrates a diagram showing a screen configuration of the security settings.

FIG. 10 illustrates the recommended security setting screen 1001 displayed on the operation unit 102. In FIG. 10, a network environment in-house LAN button 1002 collectively sets a series of security settings that are proper if the network environment of the MFP 100 corresponds to the in-house LAN. A network environment at-home button 1003 collectively sets a series of security settings that are proper if the network environment of the MFP 100 corresponding to the home. A network environment public space button 1004 collectively sets a series of security settings that are proper if the network environment of the MFP 100 corresponds to the public space. For example, if the settings are changed by pressing the various batch setting buttons 1002, 1003, or 1004 after the detection of the network environment, a detection state of the network environment change is canceled. The detection release button 1005 cancels the detection state of change in the network environment without changing the settings. The detection release button 1005 is used in case that the user wants to cancel the present detection state after confirming that the setting change is unnecessary. An information notification unit 1006 is used to notify the user of the information, similarly to the information notification unit 905. When the environment estimation processing is performed, the estimated environment may be displayed or the security setting for each environment may be automatically performed.

According to the present embodiment, the MFP 100 acquires packets at proper timing without always acquiring packets (packet information), and detects changes in the network environment based on the acquired packet information. In this way, the MFP enables accurate detection of changes in the network environment with low load. For example, by not acquiring packets until a change is detected by change detection processing based on the network configuration information, and by starting to acquire packets if a change is detected, the load on resources such as the CPU can be reduced compared to the case where packets are always acquired. Further, by detecting changes in the network environment by the change detection processing based on packet information, changes in the network environment can be detected with high accuracy.

Furthermore, by notifying the user if a change in the network environment is detected, the user can be made aware that the network environment to which the user is connected is changed, and can be prompted to change the security settings in response to the change in the network environment. In this way, the MFP 100 can make the user aware that the security settings need to be changed in response to the change in the network environment on the own information processing apparatus as an edge device, and can further support proper security settings. Therefore, even without having security expertise, the user can recognize that the settings need to be changed in response to the change in the usage environment, and can change the settings without getting lost in the operation.

In the above described embodiment, the MFP is used but the present invention is not limited to application to the MFP but is also applicable to general information processing apparatuses.

According to the present invention, changes in the network environment can be detected with high accuracy at low load.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-018972, filed Feb. 9, 2022, which is hereby incorporated by reference herein in its entirety.

What is claimed is:

1. An information processing apparatus connected to a network, the information processing apparatus comprising:
 one or more memories; and
 one or more processors that execute instructions to:
  detect change in a network environment for the information processing apparatus based on network configuration information of the network and first packet information related to one or more packets, among a plurality of packets transmitted and received in the network; and
  obtain an estimated network environment for the information processing apparatus using a pre-trained model, with data included in second packet information as input parameters,
 wherein the estimated network environment is estimated with the second packet information, which is related to one or more packets, among a plurality of packets transmitted and received in the network after detecting the change of the network environment.

2. The information processing apparatus according to claim 1, wherein the change in the network environment is detected based on the first packet information while the information processing apparatus starts up or a state of connection to the network changes from a disconnected state to a connected state.

3. The information processing apparatus according to claim 1, wherein the network configuration information includes at least one of a network address assigned to the information processing apparatus, MAC addresses and IP addresses of other information processing apparatuses connected to the network, or RA (router advertise) information of a router.

4. The information processing apparatus according to claim 1, wherein whether or not the network environment is changed is determined based on at least one of a source IP address, a destination IP address, a source port number, or a destination port number of the packet information acquired in a predetermined period.

5. A method of controlling an information processing apparatus connected to a network, the method comprising:
 detecting change in a network environment for the information processing apparatus based on network configuration information of the network and first packet information related to one or more packets, among a plurality of packets transmitted and received in the network; and
 obtaining an estimated network environment for the information processing apparatus using a pre-trained model with data included in second packet information as input parameters,
 wherein the estimated network environment is estimated with the second packet information, which is related to one or more packets, among a plurality of packets transmitted and received in the network after detecting the change of the network environment.

6. A non-transitory computer-readable storage medium storing program executable by a computer to perform a method of controlling an information processing apparatus connected to a network, the method comprising:
- detecting change in a network environment for the information processing apparatus based on network configuration information of the network and first packet information related to one or more packets, among a plurality of packets transmitted and received in the network; and
- obtaining an estimated network environment for the information processing apparatus using a pre-trained model with data included in second packet information as input parameters,
- wherein the estimated network environment is estimated with the second packet information, which is related to one or more packets, among a plurality of packets transmitted and received in the network after detecting the change of the network environment.

* * * * *